Jan. 21, 1969   G. E. BEIDERWELL   3,423,044
EXPLORING AND LIFE SAVING REELS
Filed April 11, 1967                Sheet 1 of 2

INVENTOR.
GEORGE E. BEIDERWELL
BY Shepherd & Campbell
ATTORNEYS.

United States Patent Office 3,423,044
Patented Jan. 21, 1969

3,423,044
EXPLORING AND LIFE SAVING REELS
George E. Beiderwell, 823 Harrison St.,
Paducah, Ky. 42001
Filed Apr. 11, 1967, Ser. No. 630,030
U.S. Cl. 242—96       5 Claims
Int. Cl. B65h 75/40

ABSTRACT OF THE DISCLOSURE

The device of this invention is a lifeline and rescue device of reel formation constructed to wind in a long, strong cord and having a reversible handle to adapt it for use by either right or left handed persons and being also provided with belt loops to adapt it to be mounted upon the belt of a person.

---

Figure 1:
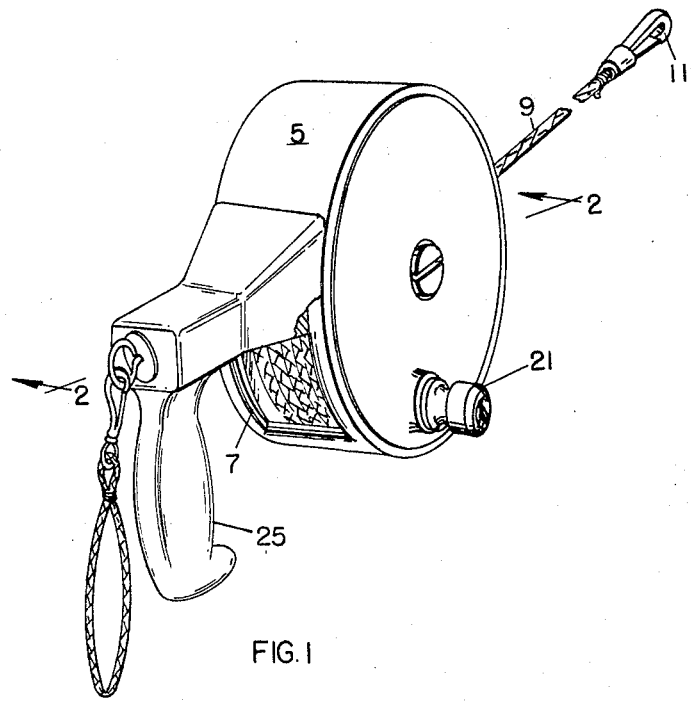
Figure 2:
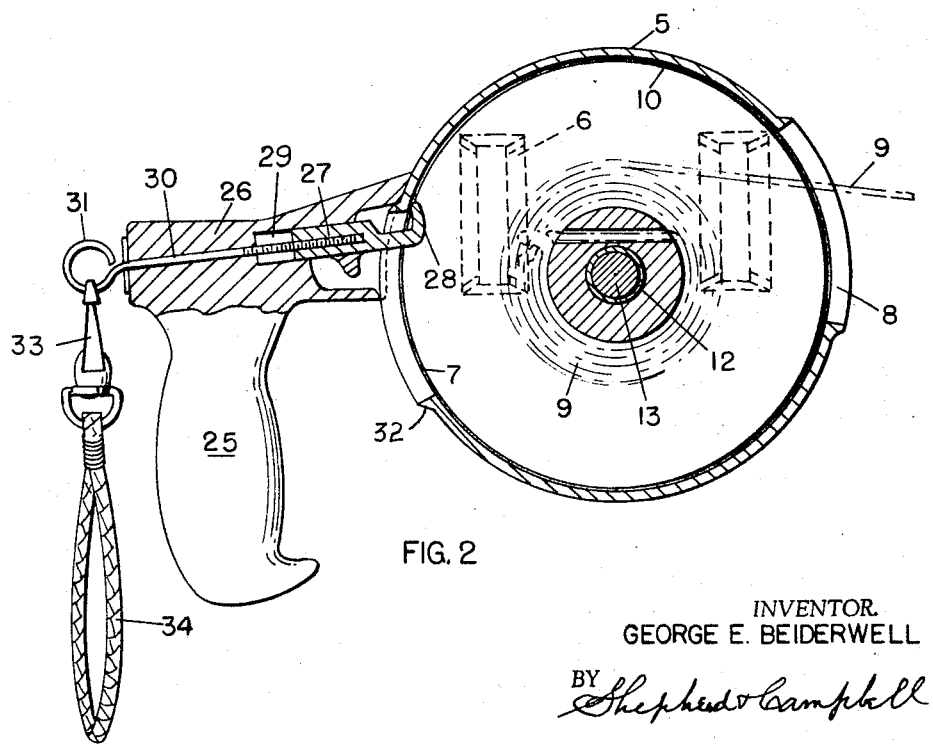
Figure 3:
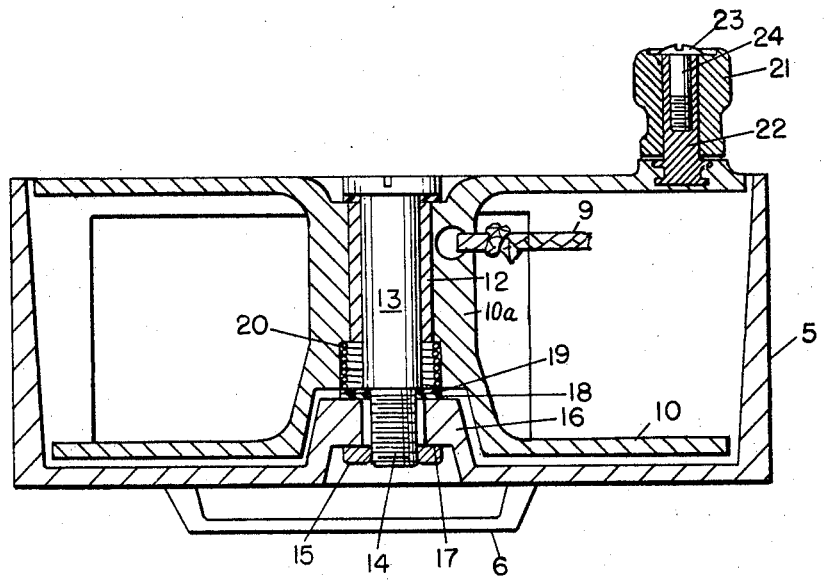
Figure 4:
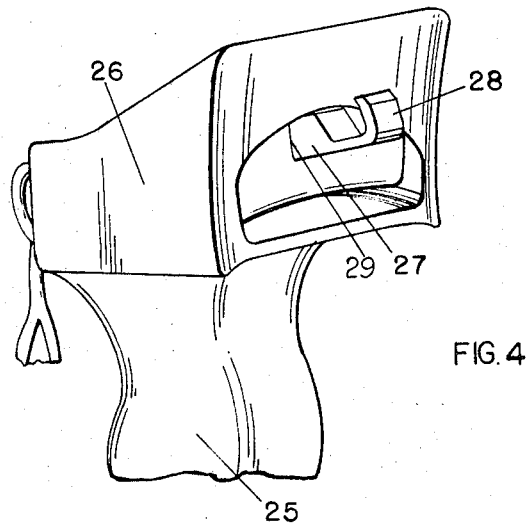

The lifeline and rescue reel of this invention will be best understood by reference to the accompanying drawings forming part of this application, and in which:

FIG. 1 is a perspective view;
FIG. 2 is a vertical sectional view upon line 2—2 of FIG. 1;
FIG. 3 is a central sectional view through the casing and spool which constitute the reel; and
FIG. 4 is a perspective view of the detachable handle, hereinafter described.

In my prior Patent No. 2,982,491 there is shown a reel intended to dispense metallic tie wires in short lengths. The reel of that patent discloses openings 26 and 27 to facilitate the use of the reel by either right or left handed workmen in withdrawing metallic tie wire from the spool of the reel. Further, the reel disclosed in the patent aforesaid has belt loops upon its casing to permit the mounting of the reel upon the belt of the workman.

An important difference between the structure of my prior patent and the device of this application resides in the provision of a reversible handle so that either a right or left handed person may freely manipulate the whole structure to its best advantage.

In the drawings, 5 designates the casing of the reel. This casing is of cup-like formation (FIG. 3) and carries upon its rear face a pair of spaced belt loops 6 by which the casing may be mounted upon the body encircling belt (not shown) of a person. The casing is provided in its side walls with a pair of outlet openings 7 and 8 through which a lifeline or rescue cord 9 may pass in being withdrawn from or wound upon the spool 10 of the reel. Any suitable cord may be used, though I have found a woven nylon cord to be extremely strong, soft and highly flexible. The inner end of the cord is securely anchored to the hub 10a of the spool, and its outer end may carry an engaging element such as the snap hook 11. Such secure anchoring may be effected by passing the end of the cord through an opening 10b in the hub of the spool and then knotting the cord.

It is very desirable that a reel which may be carried upon the person of the user, or manipulated by hand, be of very light weight. To that end both the casing 5 and spool 10 are made of aluminum or other lightweight material, but since such materials do not have good wearing qualities, I provide the hub portion of the spool with a bearing bushing 12. This sleeve rotates upon an arbor bolt 13.

The inner end of bolt 13 is reduced and threaded at 14 to have threaded engagement in a hard metal sleeve 15 that is pressed into the wall of an indented portion 16 of casing 5. A nut 17 is carried by the inner end of arbor bolt 13 and bears against the under face of indented portion 16 of the casing and sleeve 15. To prevent backlash, rotation of the spool upon bushing 12 is frictionally resisted by two nylon or other wear resisting washers 18 and 19. Washer 19 receives the thrust of a stainless steel or like rustproof spring 20, while washer 18 rests upon the upper face of the indented portion 16 of the casing.

A knob 21 provides means for manually rotating the spool, whereby to wind the cord with considerable power upon the spool.

The knob is of rustproof material and turns upon a bearing stem 22 which has secure engagement with the outer wall of the spool 10, adjacent its edge. The knob is held against movement from the stem by an overlying head 23 of a screw 24, said screw being axially threaded into the stem.

The reversible handle which constitutes the most important difference over my prior U.S. Patent No. 2,982,491 is clearly shown in FIG. 2. This handle comprises a grip 25, and a head 26, these portions of the handle being of inverted L-shape, thus permitting the most effective bodily shifting of the reel, as a whole, by one hand of the user, the other hand being left free to wind in the cord when necessary. The means illustrated for positively engaging the inner end of head 26 with the casing of the reel consists of a bolt 27 that is rectangular in cross-section (FIG. 4) and has a hook-like end 28. Bolt 27 is mounted to slide endwise in a channel 29 of head 26 under the action of a threaded stem 30 which engages in an internally threaded portion of bolt 27. Turning movement of the stem to move the bolt 27 endwise is effected by turning the ring like outer end 31 of the stem. This draws the hook-like end 28 of the bolt into tight engagement with a transverse edge of one of the openings 7 or 8. In FIG. 2 it is shown that such engagement is with the transverse upper edge of opening 7.

To ensure a firm and non-slip engagement of the inner end of head 26 with the casing of the reel, the openings 7 and 8 are bounded by raised ribs 32 and the edge portions of the inner face of head 26 (see FIG. 4) are shaped to engage over the outer faces of said ribs.

While the structure described efficiently engages the handle with an edge portion of either of the openings 7 or 8, it is clear that this novel handle structure could function to draw the handle against the side of the casing 5 by making any suitable opening in the casing wall with which the hook-like end of bolt 27 would engage.

A snap hook 33 engageable with ring 31 carries a flexible loop 34 of weatherproof material which serves to suspend the handle from the belt of the user when the handle is not in use. Its loss is thereby prevented. It can also be used as a wrist strap in case the reel is dropped. While the reel is of utility in the life saving of other persons, it is of equal value in saving the lives of the persons by which it is carried. Thus, when exploring tortuous paths, such as are found in caves, both under and above water, the user may, when starting his exploration, attach the free end of the line to some fixed object. He then starts his exploration, paying out the line as he travels around all sorts of obstructions. When he gets ready to return to his starting point, he has only to wind up the line and follow its path.

It is to be understood that the invention is not limited to the precise construction set forth, but that it includes within its purview whatever changes fairly fall within the terms of the spirit of the appended claims.

I claim:
1. The combination with a reel of the character described comprising a casing, a spool, means for manually rotating the spool, an elongated, strong and flexible cord adapted to be wound upon the spool, outlet openings formed in the opposite sides of the casing through which the cord may be withdrawn, of a handle comprising a grip and a head which are complementally of inverted L- shape, a bolt having a hook-like end shaped to engage a part of the reel casing and means accessible from the exterior of the handle for exerting a drawing action upon said bolt in a direction away from said casing.

2. A structure as recited in claim 1 wherein the means for exerting such drawing action comprises a threadable stem and the bolt is provided with an internally threaded portion with which said stem engages, and means for manually rotating said stem.

3. A structure as recited in claim 1 in combination with friction means resisting rotation of the spool.

4. A structure as recited in claim 1 in combination with means for frictionally resisting the rotation of the spool, said means comprising a pair of nylon washers, one of which rests upon the casing and the second of which rests upon the first washer, and a spring bearing between the second washer and a portion of the spool.

5. The combination with a reel of the character described comprising a casing and a spool mounted for rotation within the casing, both of light weight material, means for manually rotating the spool, an elongated, strong and highly flexible cord adapted to be wound upon the spool, an outlet opening formed in a side of the casing through which the cord may be withdrawn, and means carried by the outer end of the cord for attaching such outer end to a fixed object; of a handle comprising a grip portion and a head, the inner end of the head being shaped to fit snugly against the casing at the edges of the said outlet opening of the casing, a bolt mounted for endwise movement in the head, manually operable means for imparting a forcible movement to the bolt within said head, a hook-like end upon the bolt dimensioned to pass through the outlet opening in the side of the casing and having its terminal end portion shaped to engage the inner face of the casing at a point to effect a drawing action of the inner end of the handle head against the outer face of the casing under the said forcible movement of the bolt within the casing.

References Cited

UNITED STATES PATENTS

| | | | |
|---|---|---|---|
| 2,243,305 | 5/1941 | Adler | 294—34 |
| 2,624,066 | 1/1953 | Fry | 16—114 |
| 2,683,000 | 7/1954 | Beiderwell | 242—96 |
| 2,705,813 | 4/1955 | Zide | 16—116 |
| 2,798,248 | 7/1957 | Sladky et al. | 16—116 X |
| 2,808,285 | 10/1957 | Robuck | 16—114 X |
| 3,261,567 | 7/1966 | Quenot | 242—84.8 |

WILLIAM S. BURDEN, *Primary Examiner.*